United States Patent
El-Assir et al.

(10) Patent No.: US 9,201,647 B2
(45) Date of Patent: Dec. 1, 2015

(54) CONFIGURATION MANAGEMENT CENTER

(75) Inventors: Mahmoud El-Assir, Mendham, NJ (US); Venugopal Jagannathan, Irving, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 1462 days.

(21) Appl. No.: 11/959,086

(22) Filed: Dec. 18, 2007

(65) Prior Publication Data

US 2009/0158272 A1   Jun. 18, 2009

(51) Int. Cl.
G06F 9/445  (2006.01)
G06F 9/44   (2006.01)

(52) U.S. Cl.
CPC .. G06F 8/71 (2013.01); G06F 8/61 (2013.01); G06F 8/65 (2013.01)

(58) Field of Classification Search
CPC .............. G06F 8/60; G06F 8/61; G06F 8/65; G06F 8/71
USPC .................................................. 717/174, 176
See application file for complete search history.

(56) References Cited

U.S. PATENT DOCUMENTS

| | | | |
|---|---|---|---|
| 6,789,215 B1 * | 9/2004 | Rupp et al. | 714/38.14 |
| 7,360,201 B2 * | 4/2008 | Srivastava | 717/101 |
| 2002/0100036 A1 * | 7/2002 | Moshir et al. | 717/173 |
| 2003/0237083 A1 * | 12/2003 | Hasegawa et al. | 717/176 |
| 2004/0015831 A1 * | 1/2004 | Bowhill | 717/106 |
| 2005/0044531 A1 * | 2/2005 | Chawla et al. | 717/122 |
| 2005/0262501 A1 * | 11/2005 | Marinelli et al. | 717/174 |
| 2006/0228654 A1 * | 10/2006 | Sanjar et al. | 430/438 |
| 2007/0240151 A1 * | 10/2007 | Marl et al. | 717/174 |
| 2007/0271552 A1 * | 11/2007 | Pulley | 717/120 |

* cited by examiner

*Primary Examiner* — Anna Deng
*Assistant Examiner* — Brahim Bourzik

(57) ABSTRACT

A device receives configuration information associated with software to be installed in a network, builds a software package based on the configuration information, determines one or more devices of the network to perform installation of the software package, sends a command, to perform installation of the software package, to the determined one or more devices, receives one or more software package installation results from one or more other devices of the network where the software package is installed, and generates one or more reports based on the one or more software package installation results.

23 Claims, 17 Drawing Sheets

FIG. 17

REPORT(S) ON INSTALLATION OF PACKAGE(S)

NUMBER OF SUCCESSFUL INSTALLATIONS – 98 ← 1710

PERCENT SUCCESSFUL INSTALLATIONS – 98% ← 1720

NUMBER UNSUCCESSFUL INSTALLATIONS – 2 ← 1730

PERCENT UNSUCCESSFUL INSTALLATIONS – 2% ← 1740

...

1700

CONFIGURATION MANAGEMENT CENTER

BACKGROUND

The annual number of information technology (IT) infrastructure related changes made to a large network or combination of networks may be daunting. Such changes may include application software installations (or uninstalls), application software configurations, server and/or middleware software installations, etc. Some current systems do not provide mechanisms to track, correlate, and/or report these changes, making it difficult to manage complex changes. In addition, large premiums may be paid to third party vendors to provide such enterprise scale changes to one or more networks.

BRIEF DESCRIPTION OF THE DRAWINGS

FIGS. 14-17 illustrate exemplary operations of a system according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may include systems and/or methods that automatically manage, track, correlate, and/or report package installations or IT infrastructure related changes (e.g., software installs, software uninstalls, software configurations, etc.) across a network and/or a combination of networks. For example, in one implementation, the systems and/or methods may provide an enterprise scale solution that may build, package, deploy, and/or track any changes (e.g., IT infrastructure related changes) to a network and/or a combination of networks. The systems and/or methods may ensure a single integrated point of visibility across an entire network and/or a combination of networks by integrating with IT process tools, and may eliminate the need to pay premiums for changes made by third party vendors. The systems and/or methods may automate and/or perform (e.g., across a network and/or a combination of networks) software configuration management; software packaging and deployment; server administration; tracking and reporting functions (e.g., generate reports for servers, packages, installs, uninstalls, etc.); integration with version control software; maintenance of software releases; packaging of application code and/or middleware; deployment of application code and/or middleware; remote server administration and software deployment; notification functions for the aforementioned, etc. The systems and/or methods may reduce IT change management and/or operations time, may reduce IT systems administration time, and/or may reduce manual errors caused by software configuration and/or installation changes.

Figure 1:
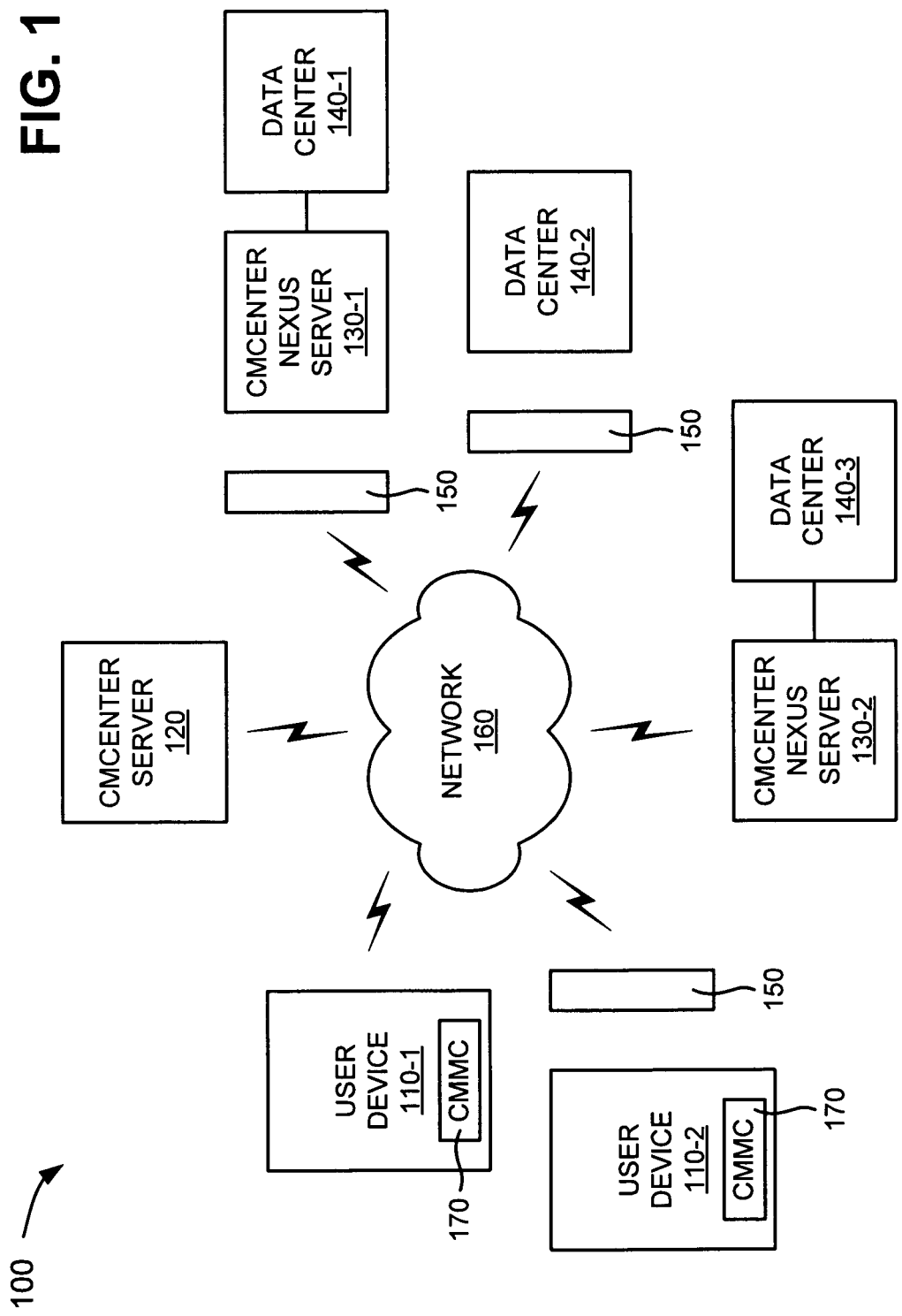
FIG. 1 is an exemplary diagram of a network in which systems and methods described herein may be implemented.

FIG. 1 is an exemplary diagram of a network 100 in which systems and methods described herein may be implemented. As illustrated, network 100 may include user devices 110-1 and 110-2 (referred to collectively as "user devices 110" or singularly as "user device 110"), a configuration management center ("cmcenter") server 120, cmcenter nexus servers 130-1 and 130-2 (referred to collectively as "cmcenter nexus servers 130" or singularly as "cmcenter nexus server 130"), data centers 140-1, 140-2, and 140-3 (referred to collectively as "data centers 140" or singularly as "data center 140"), and/or firewalls 150 interconnected by a network 160. User devices 110, cmcenter server 120, cmcenter nexus servers 130, data centers 140, and/or firewalls 150 may connect to network 160 via wired and/or wireless connections. Two user devices, a single cmcenter server, two cmcenter nexus servers, three data centers, three firewalls, and a single network have been illustrated in FIG. 1 for simplicity. In practice, there may be more or less user devices, cmcenter servers, cmcenter nexus servers, data centers, firewalls, and/or networks. Also, in some instances, one or more of user devices 110, cmcenter server 120, cmcenter nexus servers 130, and/or data centers 140 may perform one or more functions described as being performed by another one or more of user devices 110, cmcenter server 120, cmcenter nexus servers 130, and/or data centers 140.

User device 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop, a personal computer, or other types of computation or communication devices, threads or processes running on these devices, and/or objects executable by these devices. In one implementation, user device 110 may include any device that is capable of accessing a software application or a web-based application (e.g., provided by cmcenter server 120) that enables a user (e.g., a network administrator) of user device 110 to implement, review, edit, etc. a package installation or IT infrastructure change made to any of the components of network 100.

Cmcenter server 120 may include one or more server entities, or other types of computation or communication devices, that gather, process, search, and/or provide information in a manner described herein. In one implementation, cmcenter server 120 may provide a software packaging and delivery system; a web portal for build, installation, and/or server information reports that may be used to view details of IT projects being delivered and to track progress of the projects;

integration with a change request system to accelerate the process of creating a change request; integration with portals to submit firewall and/or cascading style sheets (CSS) rule requests to be submitted from a single interface; reports and/or analytical capabilities to enable management of software defects and/or to expedite software fixes; click-to-dial capabilities to seamlessly connect users; application monitoring to help application teams independently manage application probes; software patches (or hot fixes) for operating systems; a remote installer system that permits software to be remotely delivered to a number (e.g., thousands or more) of servers (e.g., data centers 140) and/or other network devices of a network (e.g., network 100) and that remotely manages the servers; a vulnerability management program for a network (e.g., network 100); a desktop distribution system that may be used by desktop distribution managers; management of traffic flow controls and/or geographic load balancing for a network (e.g., network 100); etc. In one example, such functions may be integrated together and/or executed at the same (e.g., via "one-click") by cmcenter server 120.

In another implementation, cmcenter server 120 may automate and/or perform (e.g., across a network and/or a combination of networks) software configuration management; software packaging and deployment; server administration; tracking and reporting functions (e.g., generate reports for servers, packages, installs, uninstalls, etc.); integration with version control software; maintenance of software releases; packaging of application code and/or middleware; deployment of application code and/or middleware; remote server administration and software deployment; notification functions for the aforementioned, etc.

In still another implementation, cmcenter server 120 may receive configuration and/or installation information from one of user devices 110, and/or may build a package based on the configuration and/or installation information. Cmcenter server 120 may determine one or more servers (e.g., in network 100) to perform installation of the package, and/or may send the package and a command for installation of the package to the determined one or more servers (e.g., to one of cmcenter nexus servers 130). Cmcenter server 120 may receive package installation results (e.g., from the determined one or more servers), and/or may generate reports (e.g., for display on user device 110) for the determined one or more servers and/or the package based on the installation results. Further details of cmcenter server 120 are provided below in connection with FIGS. 3 and 5-10.

Cmcenter nexus server 130 may include one or more server entities, or other types of computation or communication devices, that gather, process, search, and/or provide information in a manner described herein. In one implementation, cmcenter nexus server 130 may include one or more devices that may be used to permit cmcenter server 120 to access one or more target servers (e.g., data centers 140). In another implementation, cmcenter nexus server 130 may include remote installer logic that provides an IT infrastructure change or package installation (e.g., provided by cmcenter server 120) to any of the components of network 100 (e.g., to data centers 140). Further details of cmcenter nexus server 130 are provided below in connection with FIG. 4.

Data center 140 may include one or more server entities, or other types of computation or communication devices, that gather, process, search, and/or provide information in a manner described herein. In one implementation, data center 140 may include one or more target devices that may receive one or more IT infrastructure changes or package installations (e.g., software installations (or uninstalls), application software configurations, server and/or middleware software installations, etc.) from cmcenter server 120.

Firewall 150 may include one or more devices that may be configured to permit, deny, and/or proxy data connections set and configured to prevent unauthorized access of network 100 and/or one or more components of network 100. Firewall 150 may be hardware and/or software based. A basic task of firewall 150 may be to control traffic between devices (e.g., user devices 110, cmcenter server 120, cmcenter nexus servers 130, and/or data centers 140) of network 100 with different zones of trust. Firewall 150 may provide a controlled interface between zones of differing trust levels through the enforcement of a security policy.

Network 160 may include a local area network (LAN), a wide area network (WAN), a metropolitan area network (MAN), an intranet, the Internet, a Public Land Mobile Network (PLMN), a telephone network, such as the Public Switched Telephone Network (PSTN) or a cellular telephone network, or a combination of networks.

As further shown in FIG. 1, user devices 110-1 and 110-2 may execute a configuration management mission control (CMMC) desktop client software package 170 (e.g., provided by cmcenter server 120) that enables a user of user devices 110-1 and 110-2 to define, build, and/or implement an IT infrastructure change or package installation in network 100. User device 110-1 may have unrestricted access to cmcenter server 120. User device 110-2 may execute CMMC desktop client software package 170, but may be behind firewall 150 and/or may be locally executing firewall software.

Data center 140-1 (e.g., a target server) may be located behind firewall 150, but cmcenter server 120 may freely access data center 140-1 via cmcenter nexus server 130-1. Data center 140-2 (e.g., a target server) may be located behind firewall 150, and cmcenter server 120 may be unable to freely access data center 140-2 since there is no cmcenter nexus server connected to data center 140-2. In such circumstances, cmcenter server 120 may access data center 140-2 by accessing firewall 150 associated with data center 140-2 and establishing a nexus with data center 140-2. Data center 140-3 (e.g., a target server) may be not be located behind a firewall, and may be freely accessed by cmcenter server 120 via cmcenter nexus server 130-2.

Although FIG. 1 shows exemplary components of network 100, in other implementations, network 100 may contain fewer, different, or additional components than depicted in FIG. 1. In still other implementations, one or more components of network 100 may perform one or more other tasks described as being performed by one or more other components of network 100.

Figure 2:
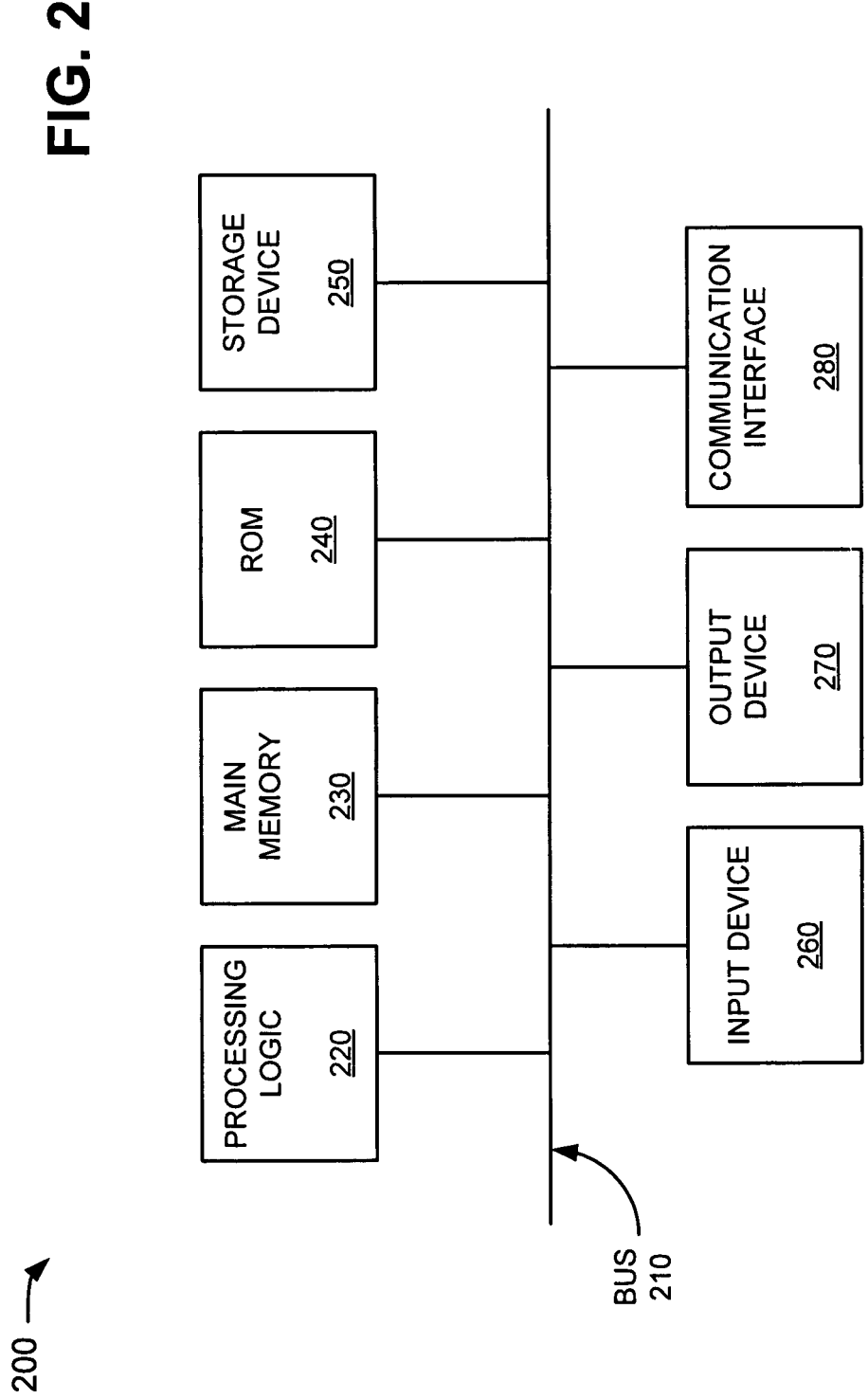
FIG. 2 illustrates exemplary components of a single user device, a configuration management center ("cmcenter") server, a single cmcenter nexus server, and/or a data center of the network depicted in FIG. 1.

FIG. 2 is an exemplary diagram of a device 200 that may correspond to user device 110, cmcenter server 120, cmcenter nexus server 130, and/or data center 140. As illustrated, device 200 may include a bus 210, processing logic 220, a main memory 230, a read-only memory (ROM) 240, a storage device 250, an input device 260, an output device 270, and/or a communication interface 280. Bus 210 may include a path that permits communication among the components of device 200.

Processing logic 220 may include a processor, microprocessor, or other type of processing logic that may interpret and execute instructions. Main memory 230 may include a random access memory (RAM) or another type of dynamic storage device that may store information and instructions for execution by processing logic 220. ROM 240 may include a ROM device or another type of static storage device that may store static information and/or instructions for use by processing logic 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network, such as network 160.

As described herein, device 200 may perform certain operations in response to processing logic 220 executing software instructions contained in a computer-readable medium, such as main memory 230. A computer-readable medium may be defined as a physical or logical memory device. The software instructions may be read into main memory 230 from another computer-readable medium, such as storage device 250, or from another device via communication interface 280. The software instructions contained in main memory 230 may cause processing logic 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, or additional components than depicted in FIG. 2. In still other implementations, one or more components of device 200 may perform one or more other tasks described as being performed by one or more other components of device 200.

Figure 3:
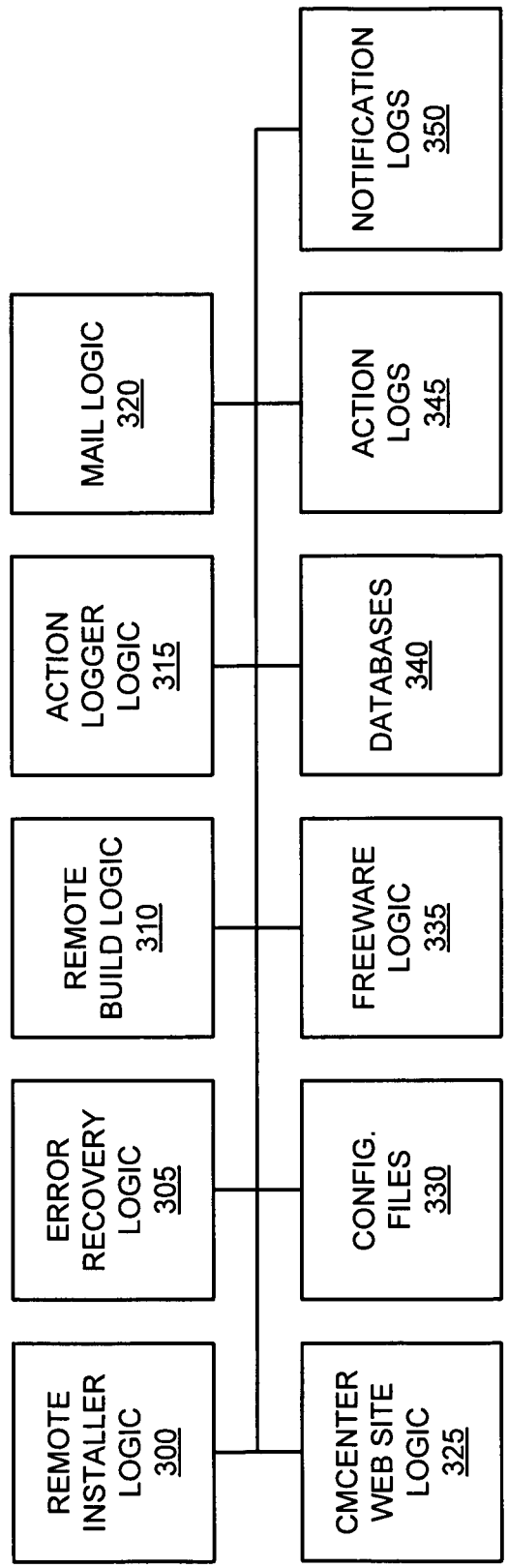
FIG. 3 depicts other exemplary components of the cmcenter server of the network illustrated in FIG. 1.

FIG. 3 depicts exemplary components of cmcenter server 120. As illustrated, cmcenter server 120 may include remote installer logic 300, error recovery logic 305, remote build logic 310, action logger logic 315, mail logic 320, cmcenter web site logic 325, configuration files 330, freeware logic 335, databases 340, action logs 345, and/or notification logs 350.

Remote installer logic 300 may include any hardware and/or software based logic that enables cmcenter server 120 to remotely install, uninstall, and/or modify a package (e.g., any software package capable of being installed, uninstalled, and/or modified on one or more devices of network 100) in any device of network 100. For example, in one implementation, remote installer logic 300 may permit cmcenter server 120 to remotely install, uninstall, configure, etc. software on data center 140-2.

Error recovery logic 305 may include any hardware and/or software based logic that enables cmcenter server 120 to recover any errors generated during installation of a package in any device of network 100. For example, in one implementation, error recovery logic 305 may receive one or more errors (or error messages) from any device in network 100 and/or allow the device to continue operating despite the one or more errors.

Remote build logic 310 may include any hardware and/or software based logic that enables cmcenter server 120 to build a package (e.g., a package based on an IT infrastructure change) for remote installation in any device of network 100. In one implementation, remote build logic 310 may launch an executable file that builds a package, may track a status of the build progress, and may update databases 340 with the status. The executable file may include information associated with a folder(s) where package files may reside, and/or may internally invoke freeware logic 335 to package an application. In one example, the package created by the executable file may include one or more cabinet (CAB) files and/or one or more extensible markup language (XML) files.

Action logger logic 315 may include any hardware and/or software based logic that enables cmcenter server 120 to record actions of a user (e.g., a user of user device 110) in action logs 345, to display such user actions, and/or to move action logs 345 from one folder to another. In one example, action logger logic 315 may record user input (e.g., parameters, devices on which to install, etc.) for a package to build via cmcenter server 120.

Mail logic 320 may include any hardware and/or software based logic that enables cmcenter server 120 to send and/or receive email (or another type of notification, such as short message service (SMS) messages, instant messages, etc.) after completion of a task by cmcenter server 120 (e.g., after completion of a package installation). In one implementation, mail logic 320 may include active server pages (ASP) mail logic to allow cmcenter server 120 to send/receive ASP-based emails, xmail logic to allow cmcenter server 120 to send/receive xmail-based emails, etc.

Cmcenter web site logic 325 may include any hardware and/or software based logic that enables cmcenter server 120 to provide one or more web pages (or web-based applications) to one or more user devices 110 for implementing, reviewing, editing, etc. an IT infrastructure change made to any of the components of network 100. In one implementation, cmcenter web site logic 325 may display a web-based application on user device 110 that enables a user of user device 110 to provide software configuration and/or installation information.

Configuration files 330 may include any files containing software configuration and/or installation information that may be received by cmcenter server 120 (e.g., from user device 110) and/or may be created by cmcenter server 120. In one implementation, configuration files 330 may include information associated with packages or IT infrastructure changes, such as application software installations (or uninstalls), application software configuration, server and/or middleware software installations, etc. Configuration files 330 may be stored in a memory device (e.g., main memory 230, ROM 240, and/or storage device 250) of cmcenter server 120.

Freeware logic 335 may include any hardware and/or software based logic that enables cmcenter server 120 to install (free of charge) any operating system-based applications. In one example, freeware logic 335 may include "inno setup," a free installer for Windows-based applications.

Databases 340 may include one or more databases containing software configuration and/or installation information that may be received by cmcenter server 120 (e.g., from user device 110) and/or may be created by cmcenter server 120. In one implementation, databases 340 may include structure query language (SQL) databases for network security information, metadata information, configuration management center information, etc. Databases 340 may be stored in a memory device (e.g., main memory 230, ROM 240, and/or storage device 250) of cmcenter server 120.

Action logs 345 may include one or more logs containing recorded actions of a user (e.g., a user of user device 110), as recorded by action logger logic 315. In one implementation, action logs 345 may be stored in a memory device (e.g., main memory 230, ROM 240, and/or storage device 250) of cmcenter server 120.

Notification logs may include one or more logs containing any notification related information (e.g., as generated and/or received by mail logic 320). In one implementation, notification logs 345 may be stored in a memory device (e.g., main memory 230, ROM 240, and/or storage device 250) of cmcenter server 120.

Although FIG. 3 shows exemplary components of cmcenter server 120, in other implementations, cmcenter server 120 may contain fewer, different, or additional components than depicted in FIG. 3. In still other implementations, one or more components of cmcenter server 120 may perform one or more other tasks described as being performed by one or more other components of cmcenter server 120.

Figure 4:
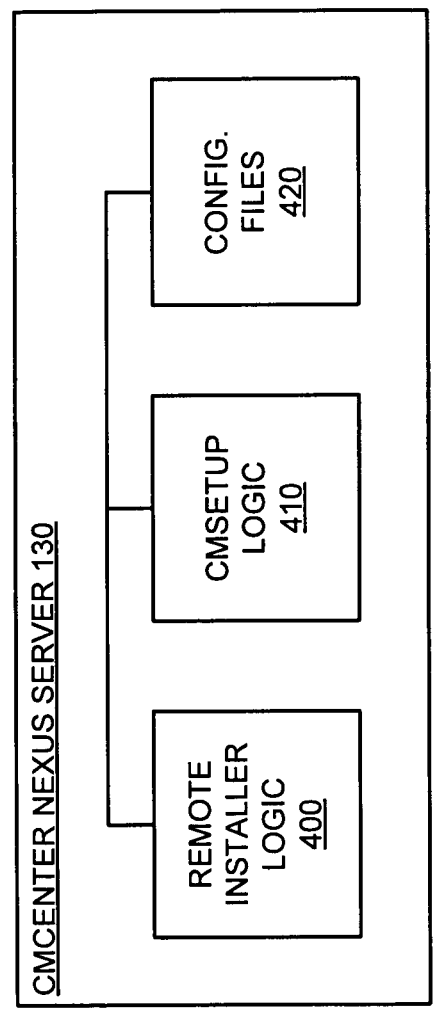
FIG. 4 depicts other exemplary components of a single cmcenter nexus server of the network illustrated in FIG. 1.

FIG. 4 depicts exemplary components of cmcenter nexus server 130. As illustrated, cmcenter nexus server 130 may include remote installer logic 400, cmsetup logic 410, and/or configuration files 420.

Remote installer logic 400 may include any hardware and/or software based logic that enables cmcenter nexus server 130 to remotely install, uninstall, and/or modify a package in any device of network 100. For example, in one implementation, remote installer logic 400 may permit cmcenter nexus server 130-1 to remotely install, uninstall, configure, etc. software on data center 140-1.

Cmsetup logic 410 may include any hardware and/or software based logic that enables cmcenter nexus server 130 to perform configuration management setup in any device of network 100. For example, in one implementation, cmsetup logic 410 may configure software of a device of network 100 (e.g., data center 140-1) based on information contained in configuration files 420.

Configuration files 420 may include any files containing software configuration and/or installation information that may be received by cmcenter nexus server 130 (e.g., from cmcenter server 120). In one implementation, configuration files 420 may include information associated with packages or IT infrastructure changes, such as application software installations (or uninstalls), application software configuration, server and/or middleware software installations, etc. Configuration files 420 may be stored in a memory device (e.g., main memory 230, ROM 240, and/or storage device 250) of cmcenter nexus server 130.

Although FIG. 4 shows exemplary components of cmcenter nexus server 130, in other implementations, cmcenter nexus server 130 may contain fewer, different, or additional components than depicted in FIG. 4. In still other implementations, one or more components of cmcenter nexus server 130 may perform one or more other tasks described as being performed by one or more other components of cmcenter nexus server 130.

Figure 5:
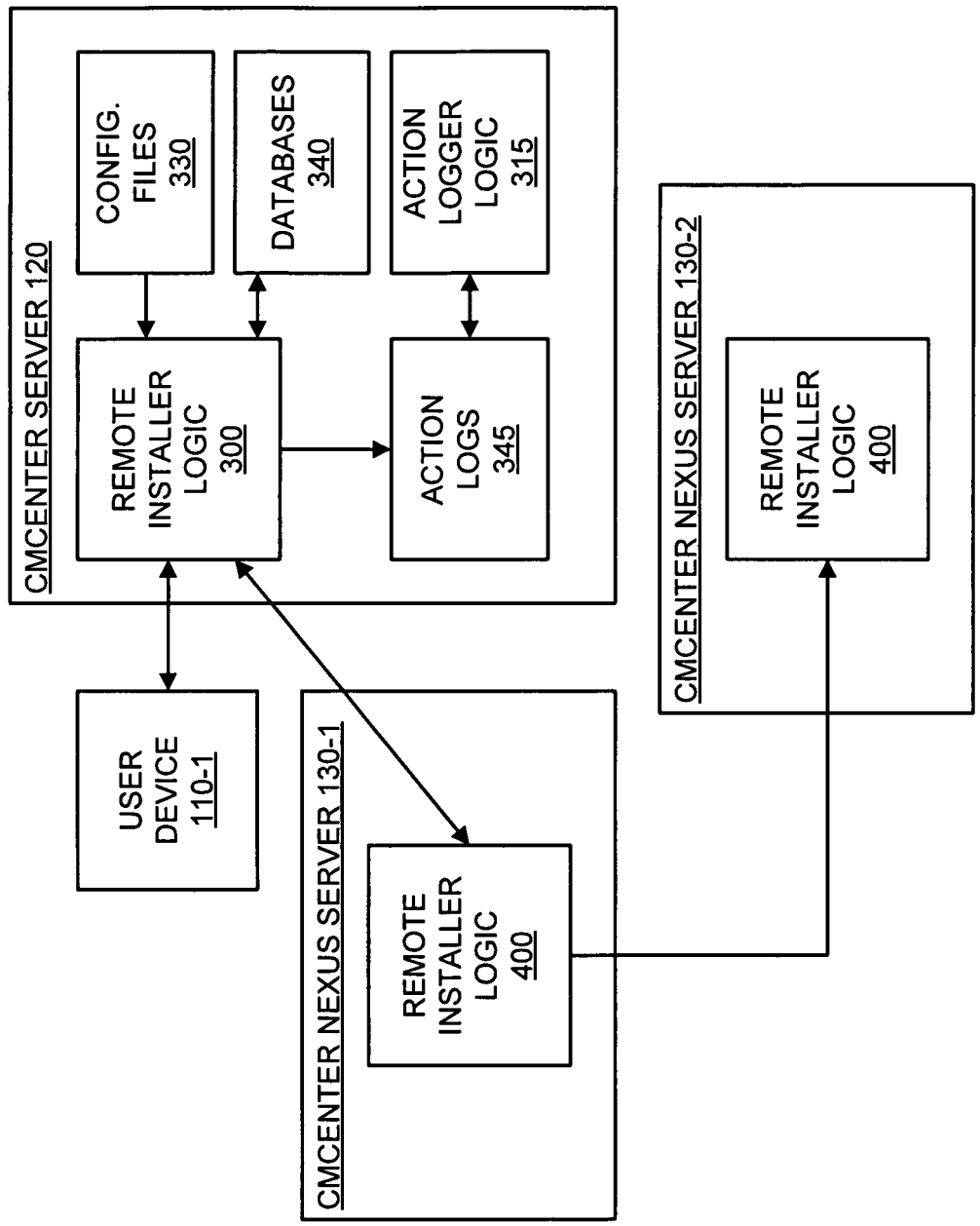
FIG. 5 illustrates exemplary interactions between a single user device, the cmcenter server, and cmcenter nexus servers of the network illustrated in FIG. 1.

FIG. 5 illustrates an exemplary portion 500 of network 100 (that includes user device 110-1, cmcenter server 120, and cmcenter nexus servers 130-1 and 130-2), and illustrates exemplary interactions between these components. As illustrated, user device 110-1 may communicate with remote installer logic 300 of cmcenter server 120. For example, in one implementation, user device 110-1 may communicate with remote installer logic 300 via a Transmission Control Protocol/Internet Protocol (TCP/IP) protocol, and/or may provide infrastructure change information (e.g., configuration and/or installation information) to remote installer logic 300.

As further shown in FIG. 5, cmcenter server 120 may generate configuration files 330 based on the information received from user device 110-1, and may provide configuration files 330 to remote installer logic 300. Remote installer logic 300 may interact with (e.g., access) one or more of databases 340 to retrieve information (e.g., network security information, metadata information, configuration management center information, etc.) based on the information received from user device 110-1. Remote installer logic 300 may also provide user actions (e.g., actions of a user of user device 110-1) to action logs 345, and action logs 345 may record the user actions and may associate the user actions with rules identifying the user. Action logger logic 315 may interact with action logs 345 to enable display of such user actions, and/or to move action logs 345 from one folder to another folder.

As also illustrated in FIG. 5, remote installer logic 300 of cmcenter server 120 may communicate (e.g., via a TCP/IP protocol) with remote installer logic 400 of cmcenter nexus server 130-1, and/or may provide infrastructure change information (e.g., software configuration and/or installation information) to remote installer logic 400. In one implementation, the infrastructure change information may include a request to install and/or implement a change in any device of network 100 (e.g., in one of data centers 140). The request may be passed from one cmcenter nexus server (e.g., cmcenter nexus server 130-1) to another cmcenter nexus server (e.g., cmcenter nexus server 130-2) until a server is determined that may perform the request (e.g., until a server is determined that may implement the infrastructure change).

Although FIG. 5 shows exemplary interactions between user device 110-1, cmcenter server 120, and cmcenter nexus servers 130-1 and 130-2, in other implementations, fewer, different, or additional devices of network 100 than depicted in FIG. 5 may be involved in the exemplary interactions.

Figure 6:
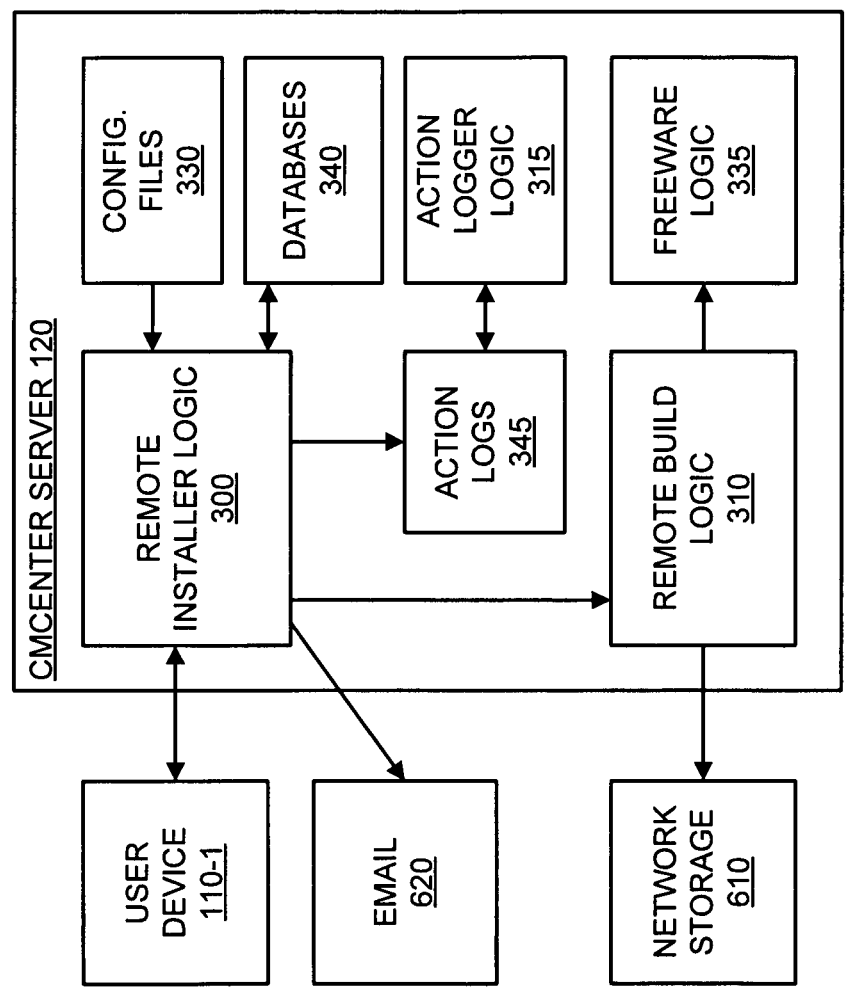
FIG. 6 depicts exemplary operations of the cmcenter server for building a package based on installation and/or configuration information.

FIG. 6 depicts an exemplary portion 600 of network 100 (that includes user device 110-1 and cmcenter server 120), and depicts exemplary operations of cmcenter server 120 for building a package based on installation and/or configuration information. As illustrated, user device 110-1 may communicate with remote installer logic 300 of cmcenter server 120. For example, in one implementation, user device 110-1 may communicate with remote installer logic 300 via a TCP/IP protocol, and/or may provide infrastructure change information (e.g., configuration and/or installation information) to remote installer logic 300.

As further shown in FIG. 6, cmcenter server 120 may generate configuration files 330 based on the information received from user device 110-1, and may provide configuration files 330 to remote installer logic 300. Remote installer logic 300 may interact with (e.g., access) one or more of databases 340 to retrieve information (e.g., network security information, metadata information, configuration management center information, etc.) based on the information received from user device 110-1. Remote installer logic 300 may also provide user actions (e.g., actions of a user of user device 110-1) to action logs 345, and action logs 345 may record the user actions and may associate the user actions with rules identifying the user. Action logger logic 315 may interact with action logs 345 to enable display of such user actions, and/or to move action logs 345 from one folder to another folder.

As also shown in FIG. 6, remote installer logic 300 may communicate with remote build logic 310, and may provide infrastructure change information (e.g., configuration and/or installation information) to remote build logic 310. Remote build logic 310 may launch an executable file that builds a package (e.g., based on the infrastructure change information received from remote installer logic 300), may track a status of the build progress, and may update databases 340 with the status. The executable file may include information identifying a folder(s) where package files may reside, and/or may internally invoke freeware logic 335 to package an application. In one example, the package created by the executable file may include one or more CAB files and/or one or more XML files. Remote build logic 310 may provide the built package to network storage 610. Network storage 610 may include one or more storage devices of a network (e.g., network 100) that may store the built package. For example, network storage 610 may include storage devices (e.g., main memory 230, ROM 240, and/or storage device 250) of any device (e.g., user devices 110, cmcenter server 120, cmcenter nexus servers 130, and/or data centers 140) of network 100. In other implementations, network storage 610 may reside in devices external to any device of network 100.

As further shown in FIG. 6, remote installer logic 300 may generate an email 620 (or some other type of notification information) after completion of a task by cmcenter server 120 (e.g., after completion of a package build). In one implementation, email 620 may be provided to user device 110-1, and/or may provide an indication of completion of the package build by cmcenter server 120.

Although FIG. 6 shows exemplary operations of cmcenter server 120, in other implementations, fewer, different, or additional operations than depicted in FIG. 6 may be performed by cmcenter server 120.

Figure 7:
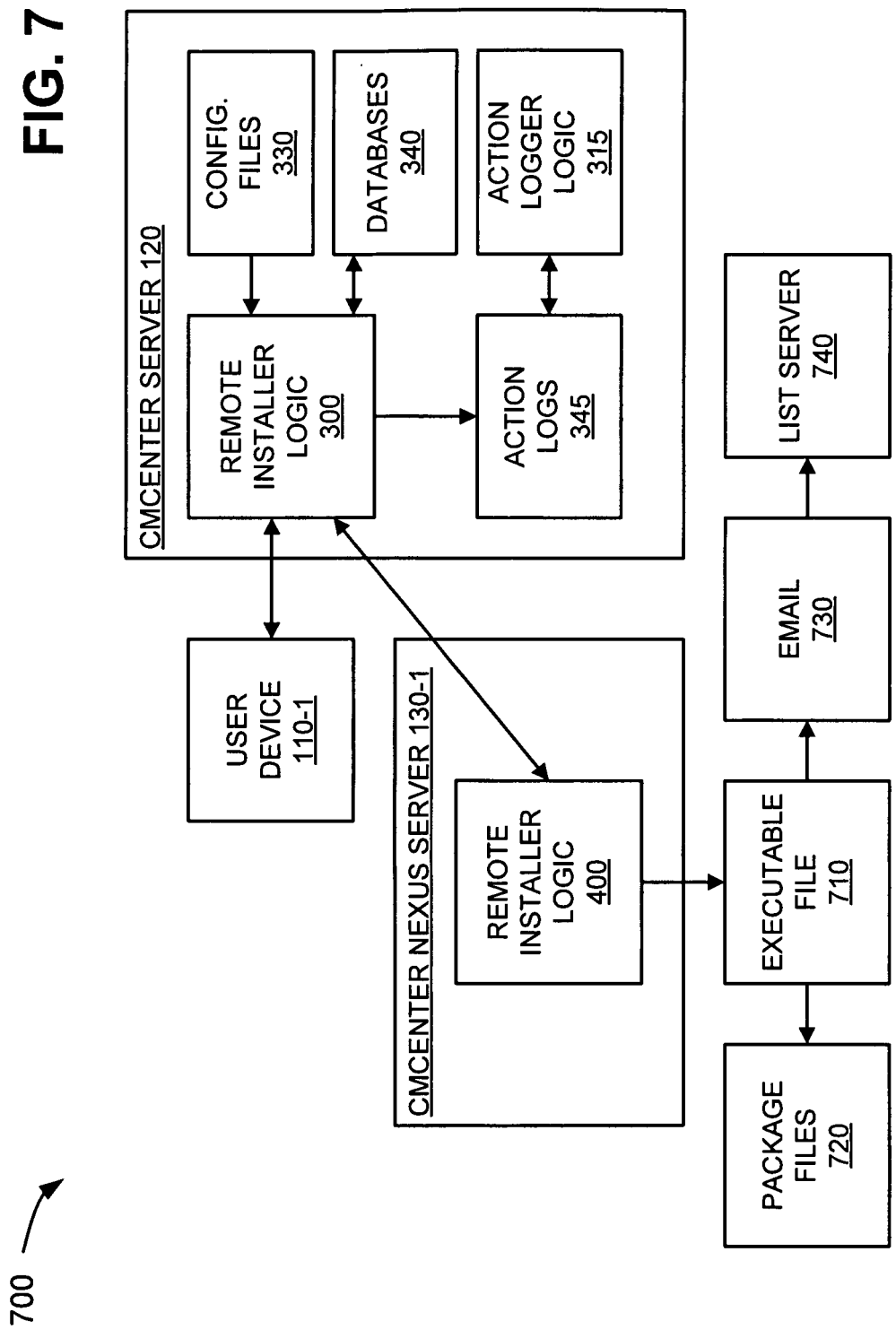
FIG. 7 illustrates exemplary operations of the cmcenter server and a single cmcenter nexus server for installing a package based on installation and/or configuration information.

FIG. 7 illustrates an exemplary portion 700 of network 100 (that includes user device 110-1, cmcenter server 120, and cmcenter nexus server 130-1), and illustrates exemplary operations of cmcenter server 120 and cmcenter nexus server 130-1 for installing a package based on installation and/or configuration information. As illustrated, user device 110-1 may communicate with remote installer logic 300 of cmcenter server 120. For example, in one implementation, user device 110-1 may communicate with remote installer logic 300 via a TCP/IP protocol, and/or may provide infrastructure change information (e.g., configuration and/or installation information) to remote installer logic 300.

As further shown in FIG. 7, cmcenter server 120 may generate configuration files 330 based on the information received from user device 110-1, and may provide configuration files 330 to remote installer logic 300. Remote installer logic 300 may interact with (e.g., access) one or more of databases 340 to retrieve information (e.g., network security information, metadata information, configuration management center information, etc.) based on the information received from user device 110-1. Remote installer logic 300 may also provide user actions (e.g., actions of a user of user device 110-1) to action logs 345, and action logs 345 may record the user actions and may associate the user actions with rules identifying the user. Action logger logic 315 may interact with action logs 345 to enable display of such user actions, and/or to move action logs 345 from one folder to another folder.

As also shown in FIG. 7, remote installer logic 300 of cmcenter server 120 may communicate (e.g., via a TCP/IP protocol) with remote installer logic 400 of cmcenter nexus server 130-1, and/or may provide infrastructure change information (e.g., software configuration and/or installation information, a package, etc.) to remote installer logic 400. In one implementation, the infrastructure change information may include a request to install and/or implement a change (e.g., a package) in a device of network 100 (e.g., in one of data centers 140). Remote installer logic 400 may launch an executable file 710 that may install the package and/or any package files 720 associated with the package (e.g., on the device of network 100). Executable file 710 may track results of the package installation, and/or may provide notification (e.g., in the form of an email 730) of the installation results to a list server 740. List server 740 may include one or more server entities that may manage mailing lists for groups of users.

Although FIG. 7 shows exemplary interactions between user device 110-1, cmcenter server 120, and cmcenter nexus server 130-1, in other implementations, fewer, different, or additional devices of network 100 than depicted in FIG. 7 may be involved in the exemplary interactions.

Figure 8:
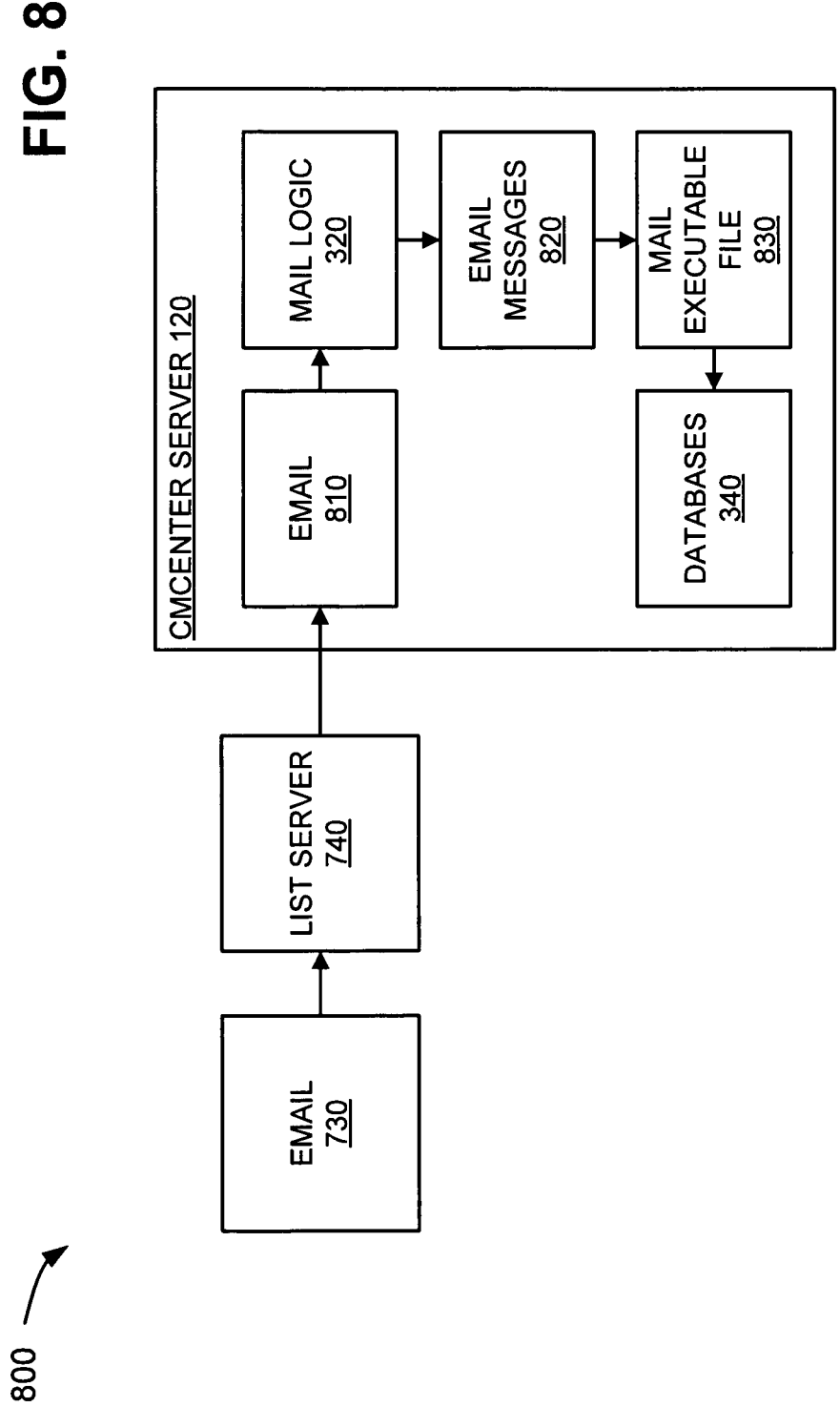
FIG. 8 illustrates exemplary receipt of package installation results by the cmcenter server of the network depicted in FIG. 1.

FIG. 8 illustrates an exemplary portion 800 of network 100 (that includes cmcenter 120), and illustrates exemplary receipt of package installation results by cmcenter server 120. As shown, email 730 providing the installation results may be provided to list server 740. List server 740 may provide the installation results in the form of an email 810 to cmcenter server 120. Email 810 may be receive by mail logic 320, and/or mail logic 320 may store email 810 in a folder associated with email messages 820.

Email messages 820 may include one or more emails (or other type of notification information) containing, for example, installation results of one or more packages. In one implementation, email messages 820 may be stored in a memory device (e.g., main memory 230, ROM 240, and/or storage device 250) of cmcenter server 120.

As further shown in FIG. 8, a mail executable file 830 may be generated by cmcenter server 120 (e.g., by mail logic 320). Mail executable file 830 may read emails contained in email messages 820, may parse the emails, and/or may update databases 340 with the parsed email information. In one implementation, the parsed email information may be used to provide statistical information associated with the installation results of various packages.

Although FIG. 8 shows exemplary operations of cmcenter server 120, in other implementations, fewer, different, or additional operations than depicted in FIG. 8 may be performed by cmcenter server 120.

Figure 9:
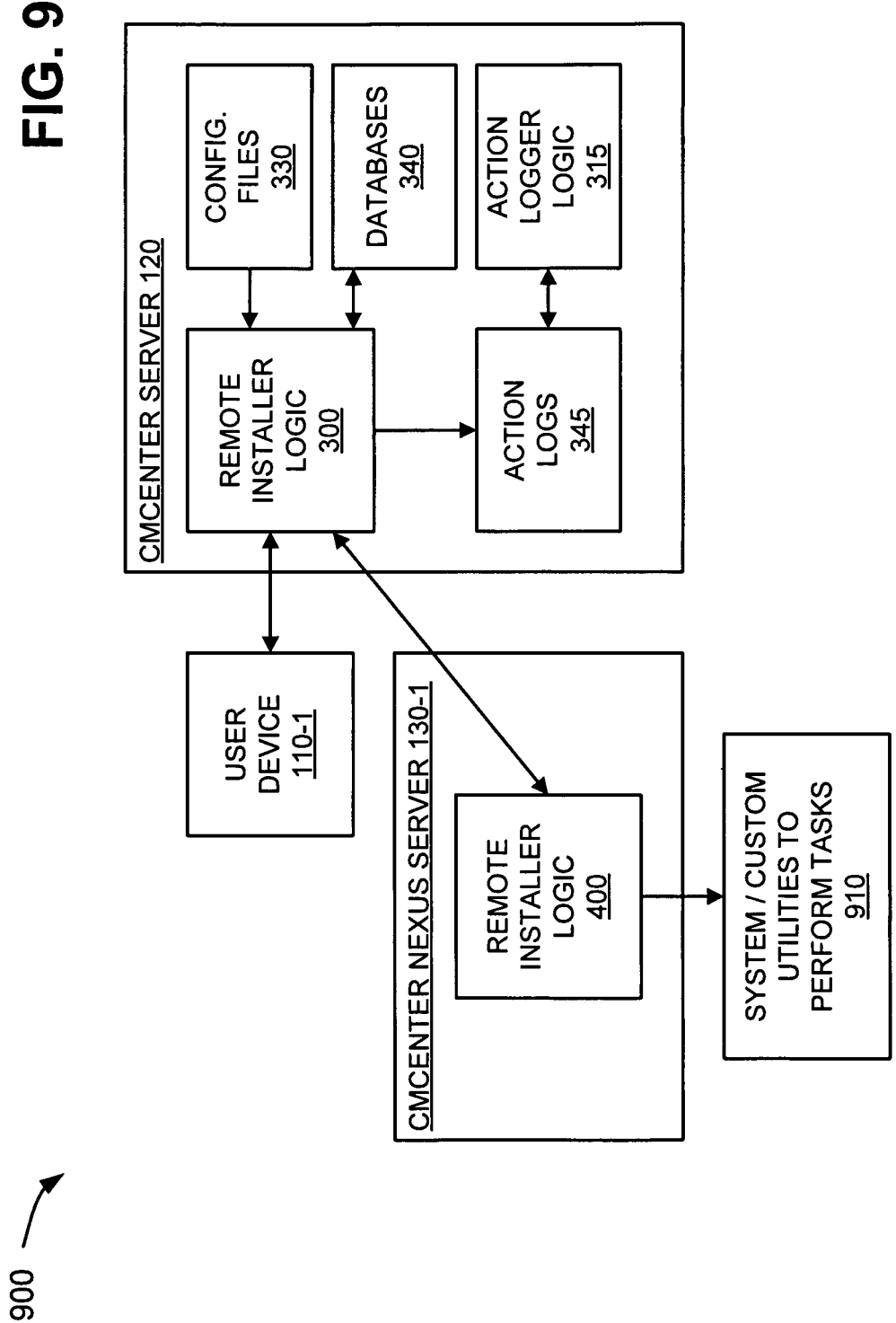
FIG. 9 illustrates exemplary execution of commands by the cmcenter server of the network depicted in FIG. 1.

FIG. 9 illustrates an exemplary portion 900 of network 100 (that includes user device 110-1, cmcenter server 120, and cmcenter nexus server 130-1), and illustrates exemplary execution of commands by cmcenter server 120. As shown, user device 110-1 may communicate with remote installer logic 300 of cmcenter server 120. For example, in one implementation, user device 110-1 may communicate with remote installer logic 300 via a TCP/IP protocol, and/or may provide infrastructure change information (e.g., configuration and/or installation information) to remote installer logic 300.

As further shown in FIG. 9, cmcenter server 120 may generate configuration files 330 based on the information received from user device 110-1, and may provide configuration files 330 to remote installer logic 300. Remote installer logic 300 may interact with (e.g., access) one or more of databases 340 to retrieve information (e.g., network security information, metadata information, configuration management center information, etc.) based on the information received from user device 110-1. Remote installer logic 300 may also provide user actions (e.g., actions of a user of user device 110-1) to action logs 345, and action logs 345 may record the user actions and may associate the user actions with rules identifying the user. Action logger logic 315 may interact with action logs 345 to enable display of such user actions, and/or to move action logs 345 from one folder to another folder.

As also illustrated in FIG. 9, remote installer logic 300 of cmcenter server 120 may communicate (e.g., via a TCP/IP protocol) with remote installer logic 400 of cmcenter nexus server 130-1, and/or may provide infrastructure change information (e.g., software configuration and/or installation information) to remote installer logic 400. In one implementation, the infrastructure change information may include a command to execute an installation and/or a change in any device of network 100 (e.g., in one of data centers 140). If remote installer logic 400 receives the command to execute, remote installer logic 400 may generate system and/or custom utilities to perform tasks (as indicate by reference number 910). In one implementation, system/custom utilities to perform tasks 910 may include "dir," "pslist," "start IIS," "install kit," etc. custom utilities to perform tasks. System/custom utilities to perform tasks 910 may utilize an appropriate utility and/or script object, and/or may pass the script object for execution. Result(s) of execution of the script object may be communicated back to remote installer logic 300 of cmcenter server 120 (e.g., via cmcenter nexus server 130-1), and/or remote installer logic 300 may communicate the result(s) of the execution back to user device 110-1.

Although FIG. 9 shows exemplary interactions between user device 110-1, cmcenter server 120, and cmcenter nexus server 130-1, in other implementations, fewer, different, or additional devices of network 100 than depicted in FIG. 9 may be involved in the exemplary interactions.

Figure 10:
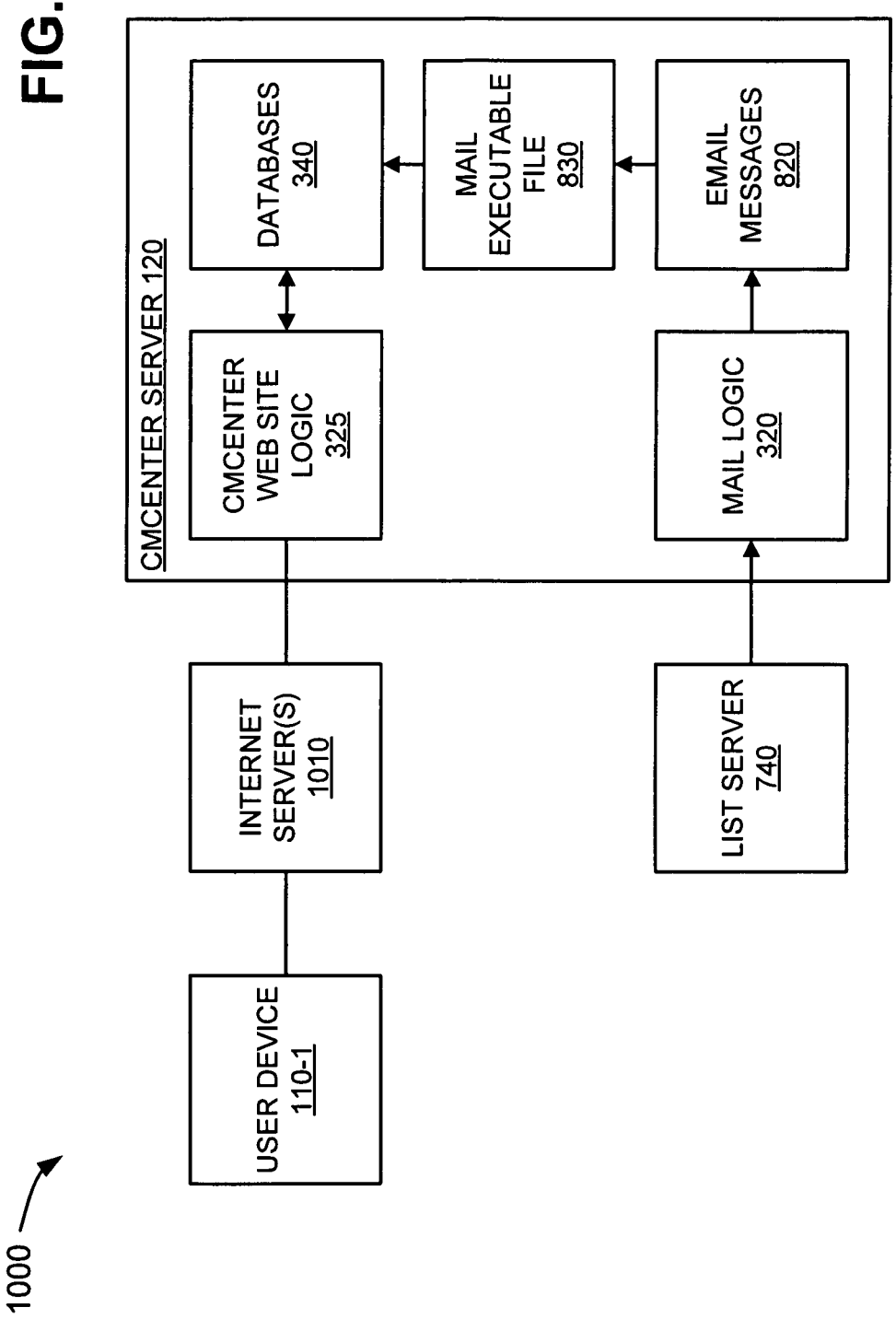
FIG. 10 illustrates exemplary web interface interactions between a single user device and the cmcenter server of the network depicted in FIG. 1.

FIG. 10 illustrates an exemplary portion 1000 of network 100 (that includes user device 110-1 and cmcenter server 120), and illustrates exemplary web interface interactions between user device 110-1 and cmcenter server 120. As shown, user device 110-1 may access cmcenter web site logic 325 of cmcenter server 120 via one or more internet servers 1010. Internet server(s) 1010 may include one or more server entities that provide Internet-based services (e.g., via an Internet-based protocol, such as a hypertext markup language (HTML) protocol) to user device 110-1 and/or cmcenter server 120. Cmcenter web site logic 325 may provide one or more web pages (or web-based applications) to user device 110-1 for implementing, reviewing, editing, etc. an infrastructure change made to any of one or more components of network 100. Cmcenter web site logic 325 may interact with databases 340 to access information associated with the one or more web pages (or web-based applications) provided by cmcenter web site logic 325.

As further shown in FIG. 10, list server 740 may provide the installation results (e.g., information relating to the infrastructure change in the form of email 810, not shown) to cmcenter server 120. Email 810 (not shown) may be received by mail logic 320, and/or mail logic 320 may store email 810 in a folder associated with email messages 820. Mail executable file 830 may be generated by cmcenter server 120 (e.g., by mail logic 320), may read emails contained in email messages 820, may parse the emails, and/or may update databases 340 with the parsed email information. In one implementation, the parsed email information may be used to provide statistical information associated with the installation results of various packages.

Although FIG. 10 shows exemplary operations of cmcenter server 120, in other implementations, fewer, different, or additional operations than depicted in FIG. 10 may be performed by cmcenter server 120.

Figure 11:
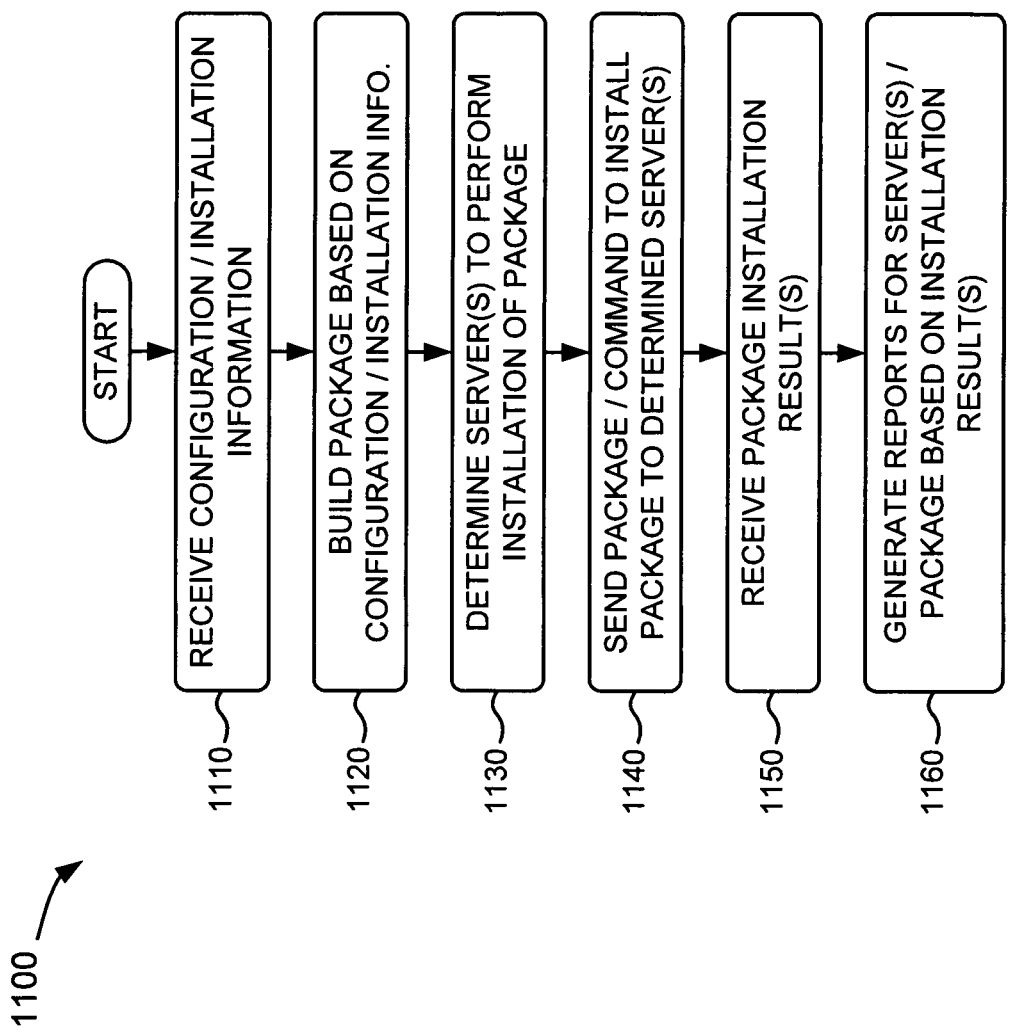
FIGS. 11-13 depict a flow chart of an exemplary process according to implementations described herein.

FIG. 11 depicts a flow chart of an exemplary process 1100 for automatically managing, tracking, correlating, and/or reporting software installations and/or configurations across a network and/or a combination of networks according to implementations described herein. In one implementation, process 1100 may be performed by cmcenter server 120. In another implementation, some or all of process 1100 may be performed by another device or group of devices, including or excluding cmcenter server 120. For example, some or all of process 1100 may be performed by one or more of cmcenter nexus servers 130.

As illustrated, process 1100 may begin with receipt of configuration and/or installation information (block 1110), and building of a package based on the configuration and/or installation information (block 1120). For example, in one implementation described above in connection with FIG. 1, cmcenter server 120 may receive configuration and/or installation information from one of user devices 110, and may build a package based on the configuration and/or installation information. In another implementation described above in connection with FIG. 6, remote installer logic 300 of cmcenter server 120 may communicate with remote build logic 310 of cmcenter server 120, and may provide infrastructure change information (e.g., configuration and/or installation information) to remote build logic 310. Remote build logic 310 may launch an executable file that builds a package (e.g., based on the infrastructure change information received from remote installer logic 300), may track a status of the build progress, and may update databases 340 with the status. The executable file may include information identifying a folder(s) where package files may reside, and/or may internally invoke freeware logic 335 to package an application.

As further shown in FIG. 11, one or more servers to perform installation of the package may be determined (block 1130), and the package and a command for installation of the package may be sent to the determined one or more servers (block 1140). For example, in one implementation described above in connection with FIG. 1, cmcenter server 120 may determine one or more servers (e.g., in network 100) to perform installation of the package, and may send the package and a command for installation of the package to the determined one or more servers (e.g., to one of cmcenter nexus servers 130). In another implementation described above in connection with FIG. 5, remote installer logic 300 of cmcenter server 120 may communicate with remote installer logic 400 of cmcenter nexus server 130-1, and may provide infrastructure change information that may include a request to install and/or implement a change in any device of network 100 (e.g., in one of data centers 140). The request may be passed from one cmcenter nexus server (e.g., cmcenter nexus server 130-1) to another cmcenter nexus server (e.g., cmcenter nexus server 130-2) until a server is determined that may perform the request (e.g., until a server is determined that may implement the infrastructure change).

Returning to FIG. 11, one or more package installation results may be received (block 1150), and one or more reports for the determined one or more servers, the package, etc. may be generated based on the one or more installation results (block 1160). For example, in one implementation described above in connection with FIG. 1, cmcenter server 120 may receive package installation results (e.g., from the determined one or more servers or data centers 140), and may generate reports for the determined one or more servers and/or the package based on the installation results. In another implementation described above in connection with FIG. 8, list server 740 may provide the installation results in the form of an email 810 to cmcenter server 120. Email 810 may be received by mail logic 320, and/or mail logic 320 may store email 810 in a folder associated with previously received email messages 820. Mail executable file 830 may be generated by cmcenter server 120 (e.g., by mail logic 320), may read emails contained in email messages 820, may parse the emails, and/or may update databases 340 with the parsed email information. In one example, the parsed email information may be used to provide statistical information (e.g., reports) associated with the installation results of various packages.

Figure 12:
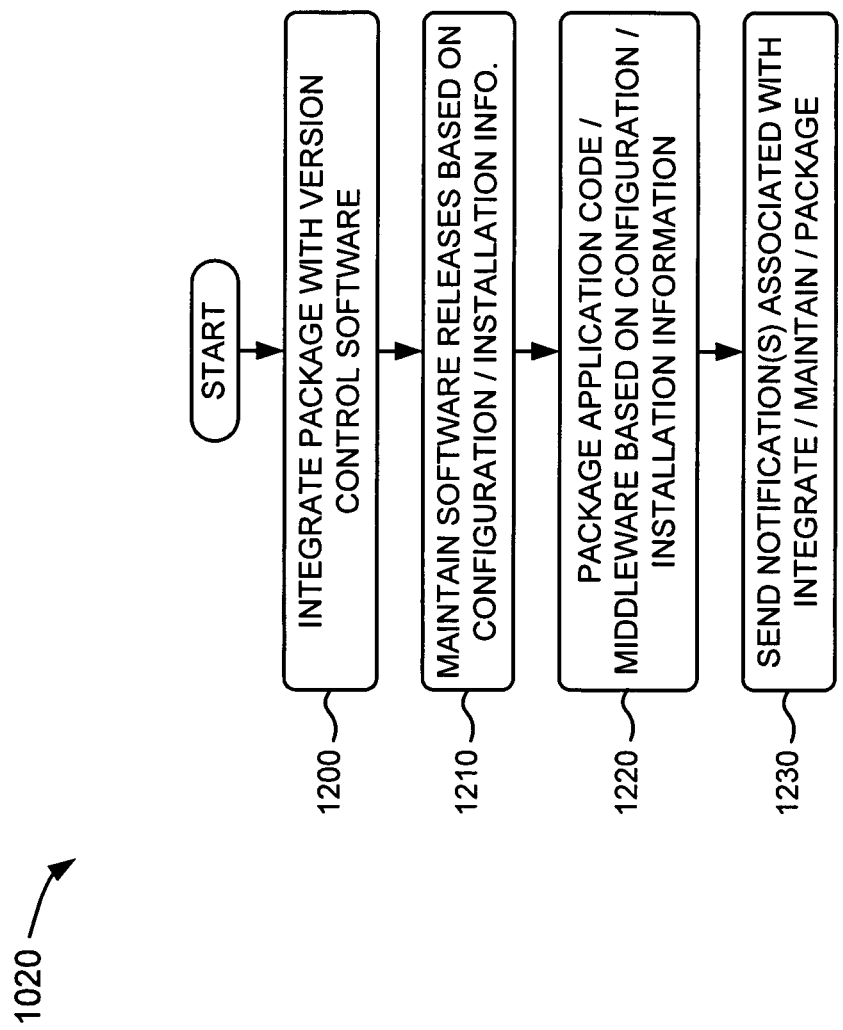

Process block 1120 may include the process blocks illustrated in FIG. 12. As shown in FIG. 12, process block 1120 may include integration of the package with version control software (block 1200), and maintenance of one or more software releases based on the configuration and/or installation information (block 1210). For example, in one implementation described above in connection with FIG. 1, cmcenter server 120 may automate and/or perform (e.g., across a network and/or a combination of networks) integration with version control software and/or maintenance of software releases. In one example, version control software may include revision control or version control systems or software that manages multiple revisions or versions of a same unit of information (e.g., a software application).

As further shown in FIG. 12, application code and/or middleware may be packaged based on the configuration and/or installation information (block 1220), and one or more notifications associated with blocks 1200-1220 may be sent (block 1230). For example, in one implementation described above in connection with FIG. 1, cmcenter server 120 may automate and/or perform (e.g., across a network and/or a combination of networks) packaging of application code and/or middleware, and/or notification functions associated with the package integration with the version control software, maintenance of software releases, and/or the packaging of the application code and/or middleware. In one example, cmcenter server 120 may provide one or more notifications associated with the aforementioned to one of user devices 110.

Figure 13:
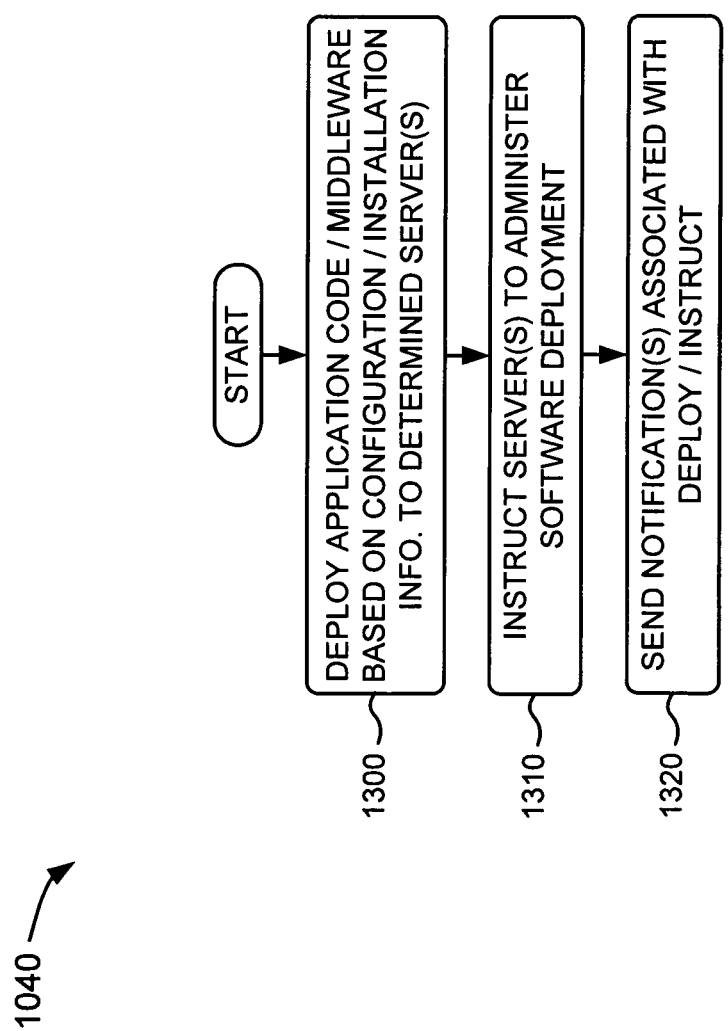

Process block 1140 may include the process blocks illustrated in FIG. 13. As shown in FIG. 13, process block 1140 may include deploying application code and/or middleware based on the configuration and/or installation information to the determined one or more servers (block 1300). For example, in one implementation described above in connection with FIG. 1, cmcenter server 120 may automate and/or perform (e.g., across a network and/or a combination of networks) deployment of application code and/or middleware. In one example, application code and/or middleware may include any application code and/or middleware capable of being executed by one or more devices of a network (e.g., network 100).

As further shown in FIG. 13, the determined one or more servers may be instructed to administer software deployment (block 1310), and one or more notifications associated with blocks 1300 and 1310 may be sent (block 1320). For example, in one implementation described above in connection with FIG. 1, cmcenter server 120 may automate and/or perform (e.g., across a network and/or a combination of networks) remote server administration and software deployment and/or notification functions associated with the deployment of the application code and/or middleware and/or instruction of the determined one or more servers to administer software deployment. In one example, cmcenter server 120 may provide one or more notifications associated with the aforementioned to one of user devices 110.

Figure 14:
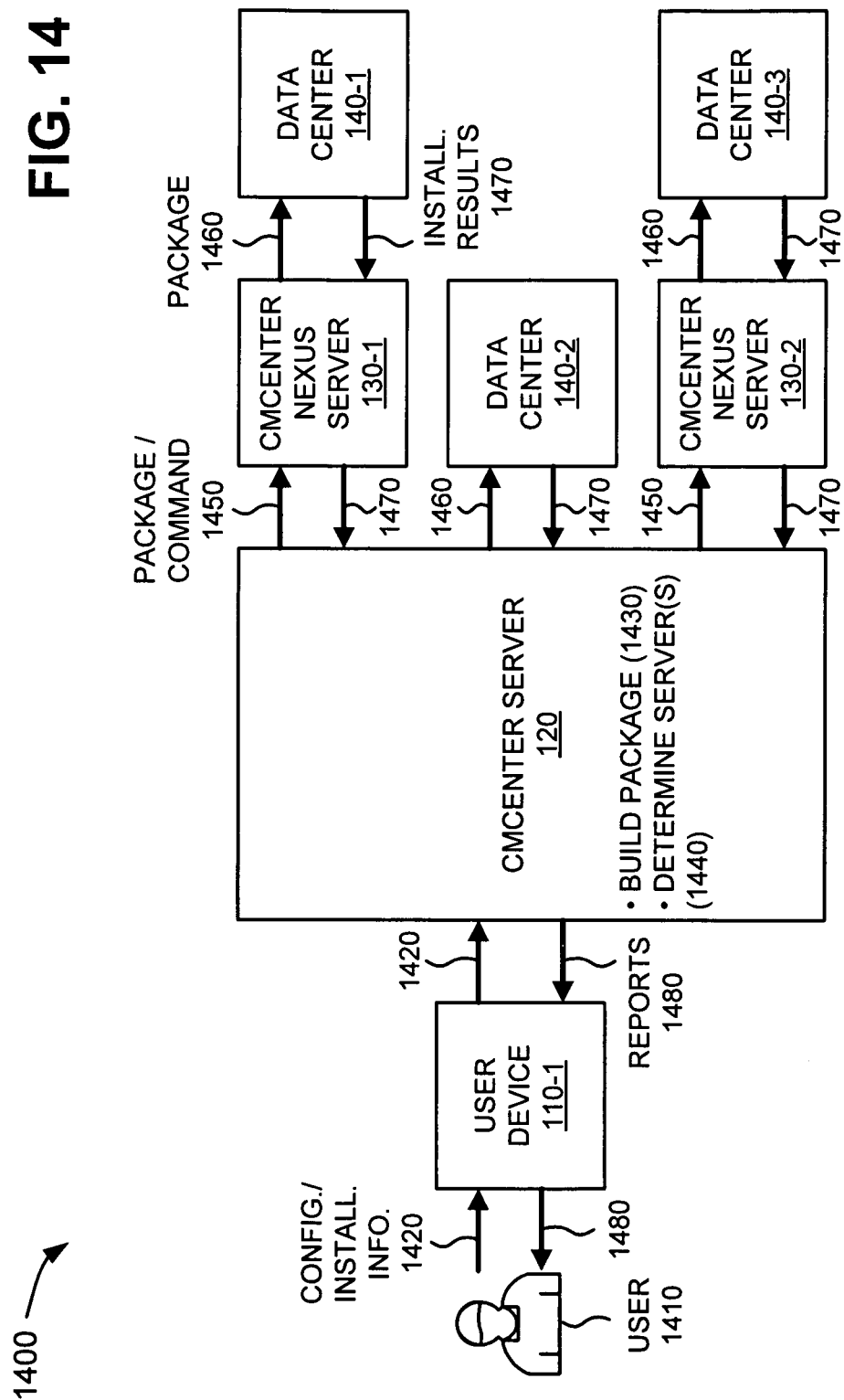
Figure 15:
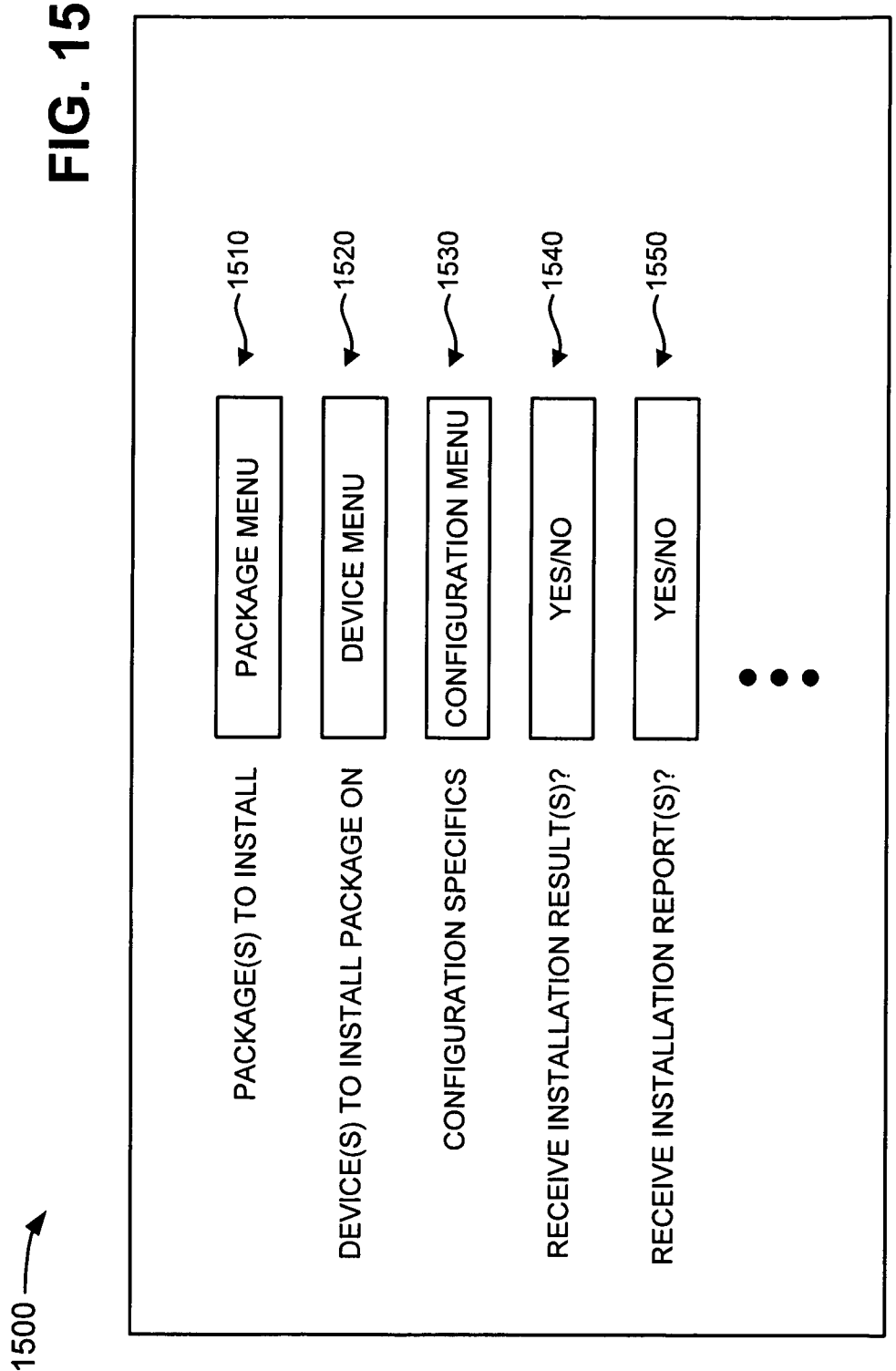
Figure 16:
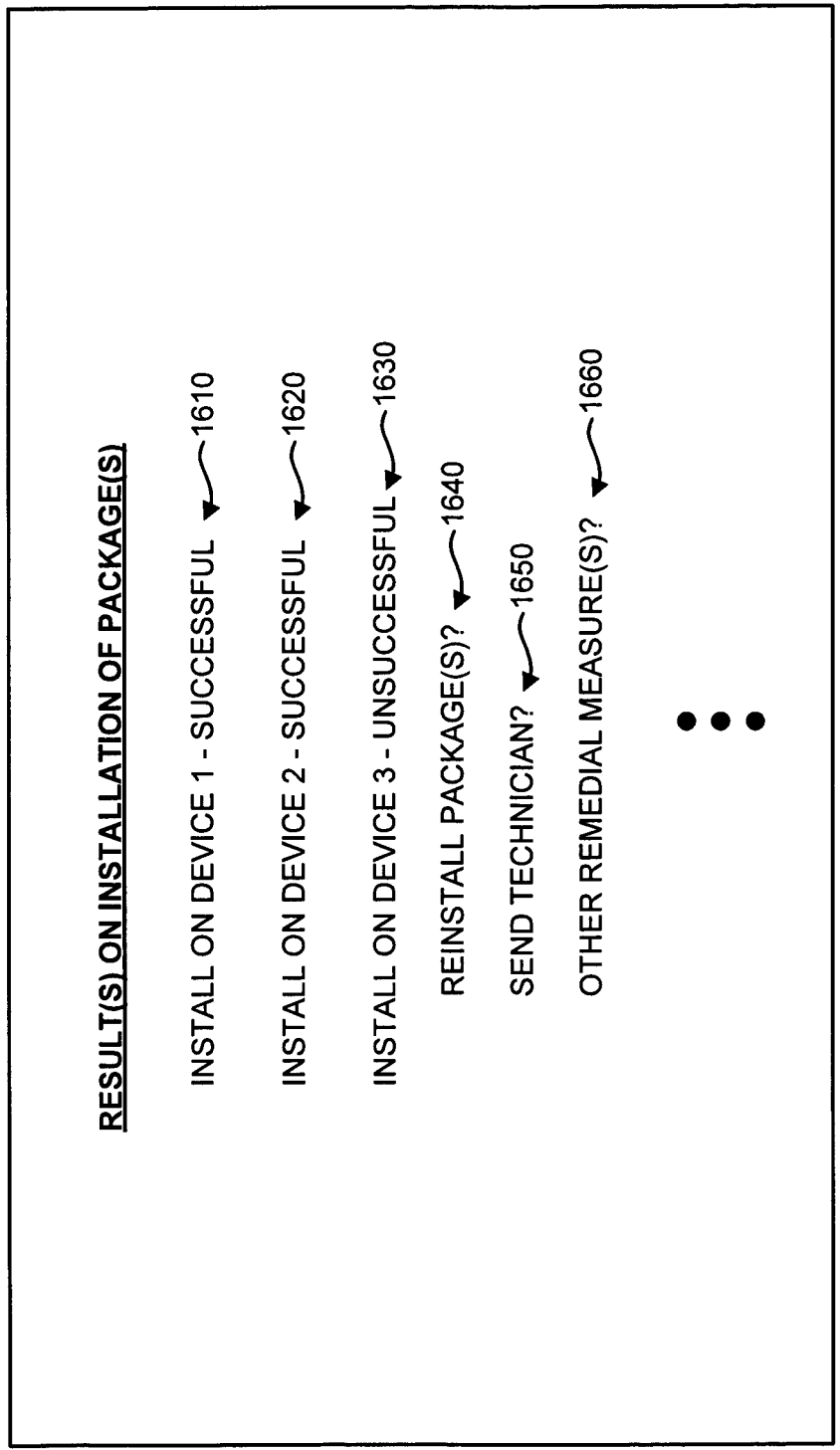

FIG. 14 illustrates exemplary operations of a system 1400 according to implementations described herein. FIGS. 15-17 depict exemplary user interfaces that may be provided by one of user devices 110 (e.g., via cmcenter server 120). Each of the user interfaces may include a graphical user interface (GUI) or a non-graphical user interface, such as a text-based interface. Each of the user interfaces may provide information to users (e.g., network administrators) via a customized interface (e.g., a proprietary interface) and/or other types of interfaces (e.g., a browser-based interface). Each of the user interfaces may receive user inputs via one or more input devices (e.g., input device 260), may be user configurable (e.g., a user may change the size of the user interface, information displayed in the user interface, color schemes used by the user interface, positions of text, images, icons, windows, etc., in the user interface, etc.), and/or may not be user configurable. Each of the user interfaces may be displayed to a user via one or more output devices (e.g., output device 170).

As shown in FIG. 14, in one implementation, system 1400 may include some of the components of network 100 (e.g., user device 110-1, cmcenter server 120, cmcenter nexus servers 130-1 and 130-2, and data centers 140-1, 140-2, and 140-3). User device 110-1, cmcenter server 120, cmcenter nexus servers 130-1 and 130-2, and data centers 140-1, 140-2, and 140-3 may include the features described above in connection with FIG. 1. A user 1410 (e.g., a network administrator) may input configuration and/or installation information 1420 to user device 110-1. Configuration/installation information 1420 may include information associated with a package to be installed on one or more devices of system 1400. User device 110-1 may provide configuration/installation information 1420 to cmcenter server 120. As shown in FIG. 15, user device 110-1 may provide a user interface 1500 that enables user 1410 to input configuration/installation information 1420, such as one or more packages to install 1510, one or more devices to install package on 1520, configuration specifics of the installation(s) 1530, whether to receive installation results 1540, and/or whether to receive installation reports 1550.

Returning to FIG. 14, cmcenter server 120 may use configuration/installation information 1420 to build a package (as indicated by reference number 1430) and to determine one or more servers in system 1400 for installing the package (as indicated by reference number 1440). Cmcenter server 120 may send a package and a command 1450 to install the package to cmcenter nexus server 130-1, data center 140-2, and cmcenter nexus server 130-2. Command 1450 may instruct cmcenter nexus servers 130-1 and 130-2 to install a package 1460 on data centers 140-1 and 140-3, respectively. Data centers 140-1, 140-2, and 140-3 may receive package 1460 for installation, and may generate installation results 1470 (e.g., successful installation, unsuccessful installation, etc.) based on installation of package 1460. Data centers 140-1 and 140-3 may provide installation results 1470 to cmcenter server 120, via cmcenter nexus server 130-1 and 130-2, respectively, and data center 140-2 may provide installation results 1470 directly to cmcenter server 120.

Cmcenter server 120 may generate and provide one or more reports 1480 based on the received installation results 1470 to user device 110-1 for display to user 1410. In one example, reports 1480 may include installation results 1470 that may be provided to user device 110-1 for display to user 1410. As shown in FIG. 16, user device 110-1 may provide a user interface 1600 that displays installation results 1470, such as a successful installation on a first device 1610, a successful installation on a second device 1620, an unsuccessful installation on a third device 1630, whether to reinstall unsuccessful packages 1640, whether to send a technician 1650, whether to take other remedial measures 1650 (e.g., check for errors), etc.

In another example, reports 1480 may include information associated with installation of one or more packages that may be provided to user device 110-1 for display to user 1410. As shown in FIG. 17, user device 110-1 may provide a user interface 1700 that displays reports 1480, such as a number of successful installations 1710, a percent of successful installations 1720, a number of unsuccessful installations 1730, a percent of unsuccessful installations 1740, etc.

Implementations described herein may include systems and/or methods that automatically manage, track, correlate, and/or report package installations or IT infrastructure related changes across a network and/or a combination of networks. For example, in one implementation, the systems and/or methods may provide an enterprise scale solution that may build, package, deploy, and/or track any changes to a network and/or a combination of networks. The systems and/or methods may ensure a single integrated point of visibility across an entire network and/or a combination of networks by integrating with IT process tools, and may eliminate the need to pay premiums for changes made by third party vendors. The systems and/or methods may automate and/or perform software configuration management; software packaging and deployment; server administration; tracking and reporting functions; integration with version control software; maintenance of software releases; packaging of application code and/or middleware; deployment of application code and/or middleware; remote server administration and software deployment; notification functions for the aforementioned, etc.

The foregoing description of implementations provides illustration and description, but is not intended to be exhaustive or to limit the invention to the precise form disclosed. Modifications and variations are possible in light of the above teachings or may be acquired from practice of the invention.

For example, while a series of acts has been described with regard to FIGS. 11-13, the order of the acts may be modified in other implementations. Further, non-dependent acts may be performed in parallel.

Also, the term "user" has been used herein, and is intended to be broadly interpreted to include user devices 110 and/or cmcenter server 120 or a user (e.g., a network administrator) of user devices 110 and/or cmcenter server 120.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

Further, certain portions of the invention may be implemented as "logic" that performs one or more functions. This logic may include hardware, such as an application specific integrated circuit or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:

providing, by a server, a web-based application to a user device associated with a network, the web-based application enabling the user device to submit configuration information and installation information associated with software to be implemented in the network, the configuration information and the installation information including first information identifying a software package to be installed, second information identifying a plurality of first devices of the network on which the software package is to be installed, and third information indicating that installation reports are to be generated and transmitted to the user device;

receiving, at the server, the configuration information and the installation information associated with the software to be implemented in the network, the configuration information and the installation information being received, from the user device via the web-based application, to perform installation of the software package on the plurality of first devices of the network;

building, by the server, the software package based on the first information included in the configuration information and the installation information, the software package being associated with the software to be installed in the network, building the software package comprising:

launching, by the server, an executable file that:

builds the software package, tracks a status of a progress of building of the software package, and updates one or more memories with the status;

determining, by the server, one or more second devices of the network to perform installation of the software package;

sending, by the server, a request, to the one or more second devices, to perform the installation of the software package on one or more of the plurality of first devices;

performing, by the server, the installation of the software package on other one or more of the plurality of first devices, the other one or more of the plurality of first devices being different than the one or more of the plurality of first devices;

receiving, by the server, one or more first software package installation results from the one or more second devices after the software package is installed on the one or more of the plurality of first devices by the one or more second devices;

receiving, by the server, one or more second software package installation results from the other one or more of the plurality of first devices after the software package is installed on the other one or more of the plurality of first devices by the server; and generating, by the server, one or more reports associated with the plurality of first devices or the software package, the one or more reports being generated based on the third information, the one or more first software package installation results, and the one or more second software package installation results, the one or more reports including:

information identifying a quantity of successful installations of the software package, and information identifying a quantity of unsuccessful installations of the software package, the one or more reports being provided to the user device, via the web-based application, for display based on the third information,
generating the one or more reports comprising:
   storing, by the server, the one or more first software package installation results and the one or more second software package installation results,
   parsing, by the server, the one or more first software package installation results and the one or more second software package installation results, and
   generating, by the server, the one or more reports based on the parsed one or more first software package installation results and the parsed one or more second software package installation results,
   building the software package, determining the one or more second devices, sending the request, performing the installation of the software package, receiving the one or more first software package installation results, receiving the one or more second software package installation results, and generating the one or more reports being performed automatically, by the server, based on receiving the configuration information and the installation information.

2. The method of claim 1, where building the software package comprises:
   integrating the software package with version control software; and
   sending one or more notifications associated "With integrating the software package with the version control software.

3. The method of claim 1, where building the software package comprises:
   maintaining one or more software releases based on the configuration information and the installation information; and
   sending one or more notifications associated with maintaining the one or more software releases.

4. The method of claim 1, where building the software package comprises:
   packaging application code and middleware based on the configuration information and the installation information; and
   sending one or more notifications associated with packaging the application code and the middleware.

5. The method of claim 4, where sending the request to perform the installation comprises:
   deploying the application code and the middleware based on the configuration information and the installation information to the one or more second devices; and
   sending one or more notifications associated with deploying the application code and the middleware.

6. The method of claim 4, where sending the request to perform the installation comprises:
   instructing the one or more second devices to deploy the software package to the one or more of the plurality of first devices; and
   sending one or more notifications associated with instructing the one or more second devices to deploy the software package.

7. The method of claim 1, where determining the one or more second devices of the network to perform the installation of the software package comprises:
   determining one or more devices of the network capable of executing the request to perform the installation of the software package.

8. The method of claim 1, where the one or more first software package installation results include:
   information identifying a particular first device of the one or more of the plurality of first devices on which the software package was successfully installed,
   information identifying a particular second device of the one or more of the plurality of first devices on which the software package was unsuccessfully installed,
   information indicating whether to send a technician to remedy the software package being unsuccessfully installed on the particular second device, and
   intonation indicating whether to reinstall the software package on the particular second device.

9. The method of claim 1, further comprising:
accessing one or more memories to retrieve one or more of network security intonation, metadata information, or configuration management center intonations based on the received configuration information and the installation information.

10. The method of claim 1, further comprising:
sending an email to the user device when installation of the software package on the one or more of the plurality of first devices is completed.

11. The method of claim 1, further comprising:
sending an email to the user device when installation of the software package on the one or more of the plurality of first devices is successful.

12. A system comprising:
a memory to store a plurality of instructions; and
a processor to execute the plurality of instructions in the memory to:
   provide a web-based application to a user device associated with a network,
      the web-based application enabling the user device to submit configuration information and installation information associated with software to be installed on a plurality of devices of a network,
      the configuration information and the installation information including first information identifying a software package associated with the software, second information identifying the plurality of devices, and third information indicating that installation reports are to be generated and transmitted to the user device;
   receive, from the user device and via the web-based application, the configuration information and the installation information associated with the software to be installed on the plurality of devices of the network,
      the configuration information and the installation information being received, from the user device via the web-based application, to perform installation of the software package on the plurality of devices of the network;
   build the software package based on the first information included in the configuration information and the installation information,
      when building the software package, the processor is to launch an executable file that:
         builds a software package based on the first information,
         tracks a status of a progress of building the software package, and
         updates one or more memories with the status,
   identify one or more servers of the network to perform installation of the software package on one or more of the plurality of devices, send a request, to the identified one or more servers, to perform installation of the software package on the one or more of the plurality of devices, perform the installation of the software package on other one or more of the plurality of devices, the other one or more of the plurality of devices being different than the one or more of the plurality of devices, receive one or more first software package installation results from the one or more servers after the software package is installed by the one or more servers, receive one or more second software package installation results from the other one or more of the plurality of devices after the software package is installed by the device, generate one or more reports based on the third information, the one or more first software package installation results, and the one or more second software package installation results, the one or more reports including:
information identifying a quantity of successful installations of the software package, and
information identifying a quantity of unsuccessful installations of the software package, when generating the one or more reports, the processor is to execute the plurality of instructions to:
store the one or more first software package installation results and the one or more second software package installation results,
parse the one or more first software package installation results and the one or more second software package installation results, and
generate the one or more reports based on the parsed one or more
first software package installation results and the parsed one or more second software package installation results, and
provide, based on the third information, the one or more reports to the user device for display via the web-based application, building the software package, identifying the one or more servers, sending the request, performing the installation of the software package, receiving the one or more first software package installation results, receiving the one or more second software package installation results, and generating the one or more reports being performed automatically, by the processor, based on receiving the configuration information and the installation information.

13. The system of claim 12, where the configuration intonation and the installation information comprise one or more of:
uninstallation information;
infrastructure change information associated with the network;
version control information; or
release information.

14. The system of claim 13, where the processor further executes instructions in the memory to:
receive other configuration information relating to uninstallation of other software from the user device; and
cause the uninstallation of the other software to be performed on another plurality of devices.

15. The system of claim 14, where the one or more reports further include:
information identifying a percentage of the successful installations of the software package, and
information identifying a percentage of the unsuccessful installations of the software package.

16. The system of claim 12, where the processor further executes instructions in the memory to at least one of:
integrate the software package with version control software;
maintain one or more software releases, relating to the software, based on the configuration information and the installation information; or
package application code and middleware based on the configuration information and the installation information.

17. The system of claim 12, where the processor further executes instructions in the memory to:
send one or more notifications associated with installation of the software package.

18. The system of claim 12, where the processor further executes instructions in the memory to at least one of:
deploy application code and middleware, based on the configuration information and installation information, to the identified one or more servers;
or
instruct the identified one or more servers to deploy the software package on the one or more of the plurality of devices of the network.

19. The system of claim 12, where the processor further executes instructions in the memory to:
determine servers of the network capable of executing the request to perform installation of the software package.

20. The system of claim 12, where the processor further executes instructions in the memory to:
provide for display the one or more first software package installation results to the user device via the web-based application, and
where the one or more first software package installation results include:
information identifying a particular device of the one or more of the plurality of devices on which the software package was unsuccessfully installed, and at least one of:
information indicating whether to send a technician to remedy the software package being unsuccessfully installed on the particular device, or
Information indicating whether to reinstall the software package on the particular device.

21. The system of claim 12, where the processor further executes instructions in the memory to:
access the one or more memories to retrieve one or more of network security information or metadata information based on the received configuration information and the installation information.

22. The system of claim 12, where the processor further executes instructions in the memory to:
send an email to the user device when installation of the software package on the one or more of the plurality of devices of the network is completed.

23. A non-transitory computer readable medium storing instructions, the instructions comprising:
one or more instructions which, when executed by one or more processors, cause the one or more processors to:
provide a web interface to a first device associated with a network,
the web interface enabling the first device to submit configuration information and installation information associated with software to be installed on a plurality of second devices of a network, the configuration information and the installation information including first information identifying a software package associated with the software, second information identifying the plurality of second devices, and third information indicating that installation reports are to be generated and transmitted to the first device;
receive, from the first device, the configuration information and the installation information associated with the software to be installed on the plurality of second devices of the network,
the configuration information and the installation information being received, from the first device via the web interface, to perform installation of the software package on the plurality of second devices of the network;
build the software package based on the first information,
the one or more instructions to build the software package including one or more instructions which, when executed by the one or more processors, cause the one or more processors to:
launch an executable file that:
  builds the software package based on the configuration information and the installation information,
  tracks a status of a progress of building the software package, and
  updates one or more memories with the status;
determine one or more third devices of the network to perform installation of the software package on one or more of the plurality of second devices;
send, to the one or more third devices, a command to perform the installation of the software package on the one or more of the plurality of second devices of the network;
perform the installation of the software package on other one or more of the plurality of second devices,
the other one or more of the plurality of second devices being different than the one or more of the plurality of second devices;
receive one or more first software package installation results from the one or more third devices after the software package is installed on the one or more of the plurality of second devices by the one or more third devices;
receive one or more second software package installation results from the other one or more of the plurality of second devices after the software package is installed on the other one or more of the plurality of second devices; and
generate one or more reports based on the third information, the one or more first software package installation results, and the one or more second software package installation results,
the one or more reports including:
  information identifying a quantity of successful installations of the software package, and
  information identifying a quantity of unsuccessful installations of the software package,
  the one or more instructions to generate the one or more reports including one or more instructions which, when executed the one or more processors, cause the one or more processors to:
    store the one or more first software package installation results and the one or more second software package installation results,
    parse the one or more first software package installation results and the one or more second software package installation results, and
    generate the one or more reports based on the parsed one or more first software package installation results and the parsed one or more second software package installation results,
the one or more reports being provided to the first device, based on the third information, for display via the web interface,
building the software package, determining the one or more third devices sending the command, performing the installation of the software package, receiving the one or more first software package installation results, receiving the one or more second software package installation results and generating the one or more reports being performed automatically, by the one or more processors, based on receiving the configuration information and the installation information.

* * * * *